United States Patent [19]

Parmentier et al.

[11] 4,082,383

[45] Apr. 4, 1978

[54] BALL CAGES FOR BALL BEARINGS OF THE ANGULAR CONTACT TYPE HAVING A DOUBLE ROW OF BALLS WITH OPPOSED ANGULAR CONTACTS

[75] Inventors: Jean Parmentier, Bagnolet; Jacques Saurais, Neuilly-sur-Seine; Gérard Carre, Levallois-Perret, all of France

[73] Assignee: SKF Compagnie d'Applications Mecaniques, Clamart, France

[21] Appl. No.: 746,952

[22] Filed: Dec. 2, 1976

[30] Foreign Application Priority Data

Dec. 17, 1975 France .................................. 75 38699

[51] Int. Cl.² .............................................. F16C 33/40
[52] U.S. Cl. ...................................... 308/194; 308/201
[58] Field of Search ............... 308/201, 235, 217, 194, 308/218, 196; 113/117; 29/148.4 C

[56] References Cited

U.S. PATENT DOCUMENTS 1,000,044  8/1911  Sonnberg ............................. 308/201

FOREIGN PATENT DOCUMENTS 74,249  3/1918  Austria ................................. 308/201

Primary Examiner—Duane A. Reger
Assistant Examiner—Douglas C. Butler
Attorney, Agent, or Firm—Owen, Wickersham & Erickson

[57] ABSTRACT

A ball cage for a ball bearing of the angular contact type having a double row of balls with opposed angular contacts comprises a solid central portion which is bounded between two concentric cylindrical surfaces and between two parallel planes and has cells with part-spherical surfaces for receiving the balls in each axially directed side. Elastic lips having surfaces which form continuations of the part-spherical surfaces of the cells project from the central portion axially beyond the parallel planes and these lips permit the introduction of the balls into the cells in an axial direction and retain the balls in the cells elastically. There is only a single lip between each adjacent pair of cells at each side of the central portion and the lips at each side of the central portion are similarly oriented and each lip has, adjacent its base where it joins the central portion, an area which lies in one of the planes and has substantially the shape of two triangles arranged apex to apex with the minimum width of the area in the middle of the radial thickness of the cage.

2 Claims, 4 Drawing Figures

BALL CAGES FOR BALL BEARINGS OF THE ANGULAR CONTACT TYPE HAVING A DOUBLE ROW OF BALLS WITH OPPOSED ANGULAR CONTACTS

This invention relates to cages for ball bearings of the angular contact type having a double row of balls with opposed angular contacts. Such bearings comprise two rows of balls, an outer and two inner bearing rings provided with tracks for the balls.

The simplest method of constructing ball bearings of this type consists of using two ordinary ball cages, into which the balls are introduced radially, there being one cage for each of the two rows of balls. The assembly operation is then extremely simple but the double bearing thus formed does not form a coherent unit and it is essential, in order to enable the bearing to be handled until it is installed in place, to hold the various elements of the assembly together by means of an internal sleeve, which is then extracted at the time of installation of the bearing. This is a complication. Moreover, the use of two ball cages does not permit the balls in the two rings to be placed in a staggered arrangement, which again results in an increase in the axial dimension of the bearing.

In order to overcome these disadvantages, we have disclosed in our French Pat. No. 2,138,283 a ball bearing of the type described which uses a single integral cage which permits the balls to be introduced axially into the bearing and to be retained elastically. The cage ensures retention of the balls, and thus consequently also the holding together of the bearing assembly as a whole. In this way, the temporary installation sleeve is dispensed with and, in addition, a staggered arrangement of the balls in the two rows is made possible. This results in a reduction of the axial dimension of the bearing for a given diameter of ball. This cage is formed as a solid moulding or casting having at each axially directed side cells for the balls, these cells being continued beyond the plane containing the centres of each row of the balls by flexible resilient lips of small thickness which retain the balls in the cage while permitting the balls to be elastically pushed into the cage. At each dividing wall separating two adjacent cells there are two elastic lips and in consequence these dividing walls must have a minimum thickness of twice the thickness of a lip, which in general is at least 0.6 mm when the cage is made of plastics material. This therefore imposes, between two adjacent balls in each row, a minimum separation distance of approximately 1.2 mm.

In those cases where, for reasons of size or strength, it is desired to reduce this gap, it becomes essential to reduce the thickness of the separating walls and consequently to eliminate the lips. Since there is no longer any retaining action upon the walls, it then again becomes essential to utilise an assembly sleeve as in the aforementioned arrangement.

The aim of the present invention is to overcome the aforementioned disadvantages, that is to say to provide a single cage which permits the introduction of the balls into the bearing in an axial direction and retaining them elastically, but which nevertheless makes it possible to have a small gap between adjacent balls in each row, that is to say a small thickness of dividing wall between the cells, while at the same time providing the minimum necessary dimension for the wall thickness of the elastic lips.

To this end, according to this invention, such a cage comprises a solid central portion which is bounded between two concentric cylindrical surfaces and between two parallel planes and has cells with part-spherical surfaces for receiving the balls in each axially directed side, and elastic lips having surfaces which form continuations of the part-spherical surfaces of the cells, the lips projecting from the central portion axially beyond the parallel planes, there being only a single lip between each adjacent pair of cells, and the lips at each side of the central portion being similarly oriented and each lip having adjacent its base where it joins the central portion, an area which lies in one of the planes and has substantially the shape of two triangles arranged apex to apex with the minimum width of the area in the middle of the radial thickness of the cage.

Other details of the invention will become apparent from the description below of one example of a cage on the attached drawing, in which.

Figure 1:
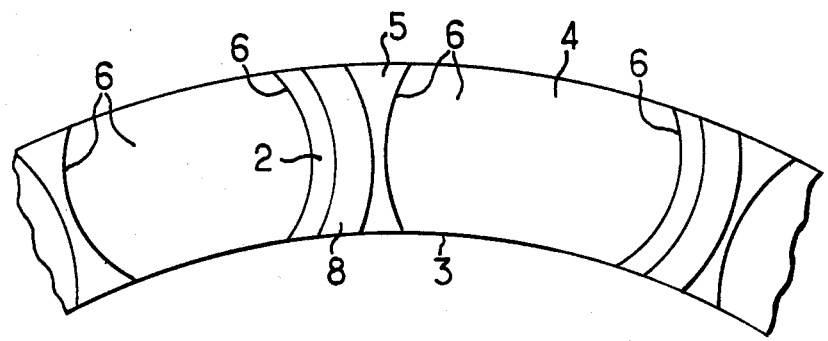
FIG. 1 is an axial view of part of the cage.

As in our earlier patent referred to above, the cage in accordance with the present invention consists of a single piece of cast or moulded plastics material, comprising a solid central portion 1 with thin lips or fingers 2 on both sides. The solid portion 1 is bounded between a cylindrical internal surface 3 and a cylindrical external surface 4 and also between two parallel planes 5, and it has ball-receiving openings or cells each having a part-spherical surface 6, the centres of which are adjacent the planes 5 or slightly inside these planes. The cells are moreover preferably situated in staggered array, as indicated in our earlier patent.

The essential difference between the cage in accordance with the present invention and the arrangement in accordance with our earlier patent lies in the fact that each dividing wall 7 between the cylindrical surfaces 6 of two adjacent cells has only a single lip 2 and not two lips as in the earlier arrangement. These lips are bounded by an internal face which is a continuation of the part-spherical surface 6 and by a substantially concentric external surface having between them a thickness of plastics material which in this example is of the order of 0.6 mm. The length of the lips 2 is determined in such a way as to obtain adequate retention of the balls. The balls which are not shown in the drawing are introduced into their respective cells with a substantially axial movement but slightly obliquely or helically, having regard to the asymmetry of the cells, which are each bordered by only a single lip 2.

The cage in accordance with the present invention therefore makes possible the same assembling of the balls and of the bearing rings as does the cage described in our earlier patent, with the same advantage of retention of the balls, and consequently of the internal bearing rings, and this makes the whole bearing assembly capable of being handled without the need to provide any additional retaining device.

The cage does however possess the advantage, by comparison with the cage described in our earlier patent, of allowing a thickness of the dividing wall 7 which is as small as may be desired, down to the limit of a value which is of the same order of magnitude at the position of its minimum thickness as the thickness of the lips 2. This thickness of course increases progressively as the internal cylindrical surface 3 or the external cylindrical surface 4 is approached. This provides the part 1 with the necessary rigidity.

For the manufacture of the internal ring of the mould in which the cage is made, it is necessary, in order to extract the moulded cage from the mould in spite of its shape which produces elastic interlocking, to provide ejectors at suitable locations. It is preferable, with the cage described in our earlier patent, to reduce the length of the elastic lips 2 in the radial direction as far as practicable in order to form a step at which the ejectors can act upon the edge face, which lies on the plane 5, of the wall between adjacent cells. This leads to the disadvantage of reducing the effective portion of the lips.

With the cage in accordance with the invention, this disadvantage no longer exists, because at the base of a convex external surface 8 of each lip 2 there remains, in the aforementioned plane 5 and between the concave spherical surface 6 and the convex spherical surface 8, an area, likewise designated 5 in FIG. 1, which has the shape of an axial section of a diabolo or of two triangles arranged apex to apex and which provides, notably in the region of the external cylindrical surface 4, a sufficiently wide surface to allow an ejector to act. This result is achieved moreover without reducing the effective radial dimension of the lips 2 and without deforming the bottoms of the cells 6.

The cage in accordance with this invention is therefore easy to manufacture accurately; it permits easy assembly of the ball bearing and a resultant assembly which is easy to handle, while at the same time it enables the objective aimed at to be achieved, that is to say of bringing the balls close together in order to increase the diameter or number of these balls for a given bearing diameter without increasing the radial dimension, or conversely, for a given ball diameter, to reduce the diameter of the bearing. This result is advantageously combined with that of our earlier patent which permits, amongst other things, a reduction in the axial dimension of the bearing.

Figure 2:
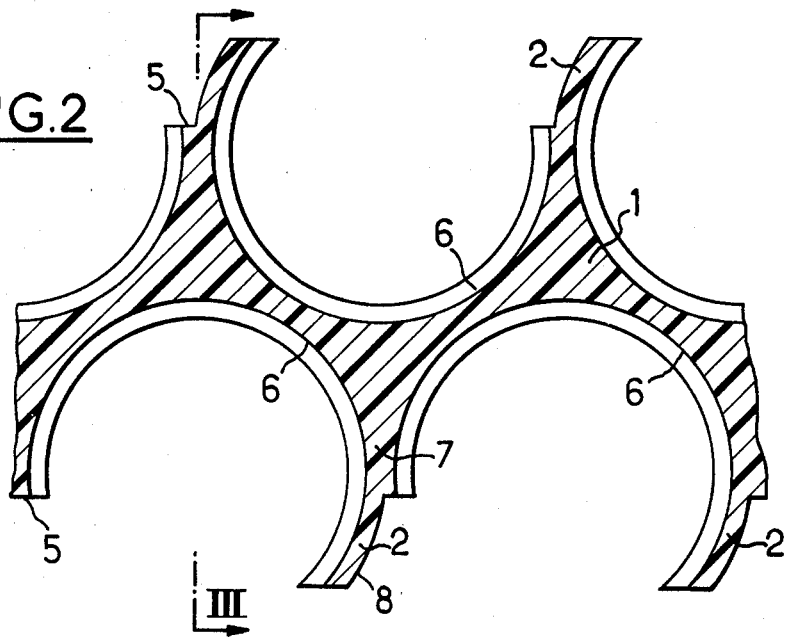
FIG. 2 is a cylindrical section through the cage along a cylinder passing through the centres of the ball-receiving openings of the cage; and, FIG. 3 is a section on the line III—III of FIG. 2.
Figure 3:
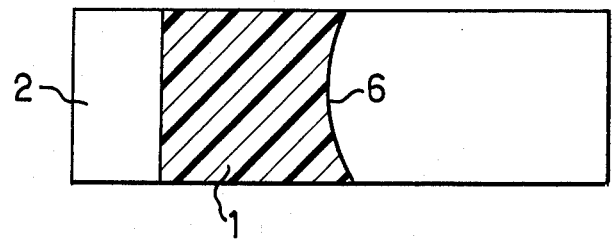
Figure 4:
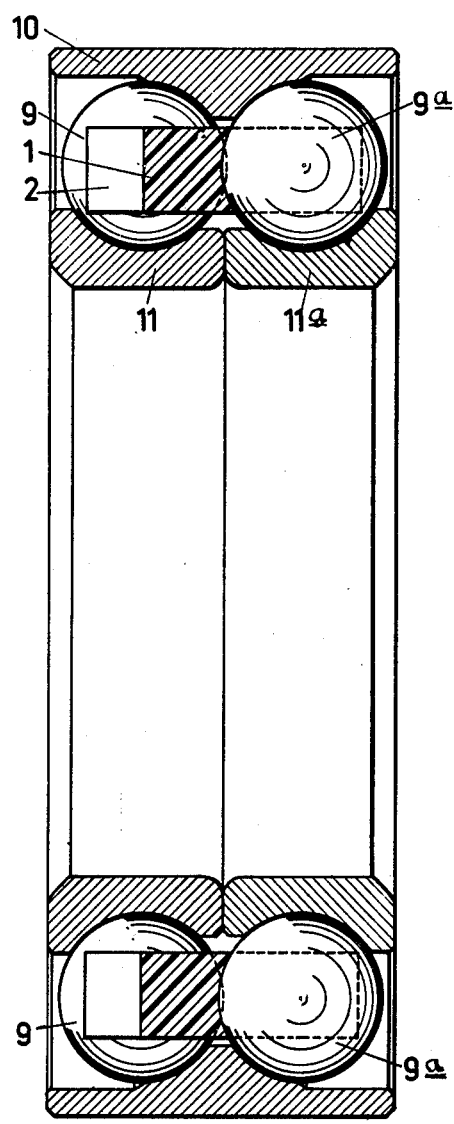
FIG. 4 is a view in axial section of a complete bearing including the cage of FIGS. 1-3.

FIG. 4 shows a complete ball bearing assembly of the angular contact type, incorporating the cage 1 of FIGS. 1-3. There are two rows of balls 9 and 9a a single outer bearing ring 10, and two inner bearing rings 11 and 11a, defining tracks for the balls 9 and 9a. The two rows of balls 9 and 9a constitute a double row of balls 9,9a with opposed angular contacts. The assembly operation is exactly the same as in French Pat. No. 2,138,283, for the cage 1 permits introduction of the balls 9 and 9a thereinto in a direction axially of the cage 1, the balls 9 and 9a then being retained elastically within the cage 1.

We claim:

1. In a ball cage for a ball bearing of the angular contact type, said bearing including a double row of balls with opposed angular contacts, said cage permitting introduction of said balls thereinto in a direction axially of said cage and retaining said balls elastically therein and comprising a solid central portion defined between two concentric cylindrical surfaces and between two parallel planes extending perpendicular to the axis of said cylindrical surfaces, means defining cells in said solid central portion, each of said cells having a part-spherical surface for receiving one of said balls, said cells being disposed in axially directed side parts of said solid central portion, and lips projecting from said solid central portion axially beyond said parallel planes, each of said lips having a surface which forms a continuation of said part-spherical surface of one of said cells, the improvement wherein only a single one of said lips is disposed between each adjacent pair of said cells in each of said axially directed side parts, said lips in each of said axially directed side parts being similarly oriented and each lip including a base where said lip joins said central portion and means adjacent said base defining an area which lies in one of said parallel planes, said area having substantially the shape of two triangles arranged to apex with a minimum width of said area at said apices substantially midway in a radial direction of said two concentric cylindrical surfaces.

2. In a ball bearing of the angular contact type comprising two rows of balls, an outer bearing ring, two inner bearing rings, said outer and inner bearing rings defining tracks for said balls and said balls in said two rows having opposed angular contacts, and a ball cage retaining said two rows of balls between said outer and inner bearing rings, said cage permitting introduction of said balls thereinto in a direction axially of said cage and retaining said balls elastically therein and comprising a solid central portion defined between two concentric cylindrical surfaces and between two parallel planes extending perpendicular to the axis of said cylindrical surfaces, means defining cells in said solid central portion, each of said cells having a part-spherical surface for receiving one of said balls, said cells being disposed in axially directed side parts of said solid central portion, and lips projecting from said solid central portion axially beyond said parallel planes, each of said lips having a surface which forms a continuation of said part-spherical surface of one of said cells, the improvement wherein only a single one of said lips is disposed between each adjacent pair of said cells in each of said axially directed side parts, said lips in each of said axially directed side parts being similarly oriented and each lip including a base where said lip joins said central portion and means adjacent said base defining an area which lies in one of said parallel planes, said area having substantially the shape of two triangles arranged apex to apex with a minimum width of said area at said apices substantially midway in a radial direction of said two concentric cylindrical surfaces.

* * * * *

UNITED STATES PATENT AND TRADEMARK OFFICE
CERTIFICATE OF CORRECTION

PATENT NO. : 4,082,383
DATED : April 4, 1978
INVENTOR(S) : Jean Parmentier, Jacques Saurais, & Gerard Carre It is certified that error appears in the above-identified patent and that said Letters Patent are hereby corrected as shown below:

Item [56] FOREIGN PATENT DOCUMENTS, left-hand column of cover page, under the Austrian patent insert
--7,118,474   4/1973   France   308/201--

Column 1, line 56, "walls" should read --balls--.

Column 4, line 22, "arranged to apex" should read --arranged apex to apex--.

Signed and Sealed this

Thirty-first Day of October 1978

[SEAL]

Attest:

RUTH C. MASON
Attesting Officer

DONALD W. BANNER
Commissioner of Patents and Trademarks